United States Patent
Li et al.

(10) Patent No.: US 11,671,900 B2
(45) Date of Patent: Jun. 6, 2023

(54) ACCESS CONTROL BARRING METHOD AND APPARATUS

(71) Applicant: BEIJING XIAOMI MOBILE SOFTWARE CO., LTD., Beijing (CN)

(72) Inventors: Yanhua Li, Beijing (CN); Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 190 days.

(21) Appl. No.: 17/278,284

(22) PCT Filed: Sep. 21, 2018

(86) PCT No.: PCT/CN2018/107050
§ 371 (c)(1),
(2) Date: Mar. 19, 2021

(87) PCT Pub. No.: WO2020/056740
PCT Pub. Date: Mar. 26, 2020

(65) Prior Publication Data
US 2021/0352571 A1      Nov. 11, 2021

(51) Int. Cl.
*H04W 4/00*      (2018.01)
*H04W 48/06*    (2009.01)
*H04W 76/18*    (2018.01)
*H04W 76/38*    (2018.01)
*H04W 48/16*    (2009.01)

(52) U.S. Cl.
CPC .......... *H04W 48/06* (2013.01); *H04W 48/16* (2013.01); *H04W 76/18* (2018.02); *H04W 76/38* (2018.02)

(58) Field of Classification Search
CPC ...... H04W 48/06; H04W 48/16; H04W 76/38
USPC ......................................................... 370/329
See application file for complete search history.

(56) References Cited

U.S. PATENT DOCUMENTS

| | | | |
|---|---|---|---|
| 2017/0311293 A1* | 10/2017 | Jung | H04W 76/14 |
| 2018/0070278 A1 | 3/2018 | Uemura et al. | |
| 2018/0124687 A1* | 5/2018 | Park | H04L 5/1469 |
| 2019/0007991 A1 | 1/2019 | Chang | |

FOREIGN PATENT DOCUMENTS

| | | |
|---|---|---|
| CN | 102137433 A | 7/2011 |
| CN | 106954270 A | 7/2017 |
| CN | 107431964 A | 12/2017 |
| CN | 107666704 A | 2/2018 |
| WO | 2013113159 A1 | 8/2013 |

OTHER PUBLICATIONS

International Search Report to PCT/CN2018/107050 dated Jun. 19, 2019 with English translation, (4p).

* cited by examiner

*Primary Examiner* — Temica M Beamer
(74) *Attorney, Agent, or Firm* — Arch & Lake LLP

(57) ABSTRACT

A method and apparatus for access control barring are disclosed. The method may include a base station configuring, for user equipment (UE), a dedicated signaling for indicating whether to restart a designated timer. The designated timer may be a timer started by the UE for barring access control. The base station may also include send the dedicated signaling to the UE, so that the UE stops or continues to run the designated timer based on the dedicated signaling.

18 Claims, 7 Drawing Sheets

--- configuring for a terminal a dedicated signaling for indicating whether to restart a designated timer, in which the designated timer is a timer started by the terminal for barring access control — 110 sending the dedicated signaling to the terminal, so that the terminal stops the dedicated timer or continues to run the dedicated timer based on the dedicated signaling — 120

ACCESS CONTROL BARRING METHOD AND APPARATUS

CROSS-REFERENCE TO RELATED APPLICATION

This application is the US national application of International Application No. PCT/CN2018/107050, filed on Sep. 21, 2018, the entire contents of which are incorporated herein by reference for all purposes.

TECHNICAL FIELD

The present disclosure relates to a field of communication technology, and more particularly, to an access control barring method and an access control barring apparatus.

BACKGROUND

In the Long Term Evolution (LTE) communication system, the working mechanism for barring Access Control (AC) is that, the corresponding AC barring parameters are obtained based on the terminal's access class and the call type initiated by the terminal, to perform an AC barring check.

For a New Radio (NR) communication system, a unified AC barring mechanism is introduced. Moreover, the unified AC barring mechanism may be used for terminals in an idle state or in an inactive state, and may also be used for terminals in a connected state.

In the related art, whether in the LTE communication system or NR communication system, the AC barring is closely related to the T30x or T302 timer. However, when the T30x or T302 timer is running, there is no optimization solution for the T30x or T302 timer running in different application scenarios.

SUMMARY

According to a first aspect of embodiments of the disclosure, a method of access control barring is provided. The method may include a base station configuring, for user equipment (UE), a dedicated signaling for indicating whether to restart a designated timer. The designated timer may be a timer started by the UE for barring access control. and the base station may also send the dedicated signaling to the UE, so that the UE stops or continues to run the designated timer based on the dedicated signaling.

According to a second aspect of the present disclosure, a method of access control barring is provided. The method may include a user equipment (UE) starting a designated timer for barring access control. The UE may also receive, from a base station, a dedicated signaling for indicating whether to restart the designated timer when the designated timer does not reach a designated stop time. The UE may further stop or continue to run the designated timer based on the dedicated signaling.

According to a third aspect of embodiments of the disclosure, a device is provided. The device includes one or more processors and a non-transitory computer-readable storage medium for storing instructions executable by the one or more processors. The one or more processors may be configured to start a designated timer for barring access control. The one or more processors may also receive, from a base station, a dedicated signaling for indicating whether to restart the designated timer when the designated timer does not reach a designated stop time. The one or more processors may further stop or continue to run the designated timer based on the dedicated signaling.

It should be understood that the above general description and the following detailed description are only exemplary and explanatory, without any limitations to the disclosure.

BRIEF DESCRIPTION OF THE DRAWINGS

The drawings herein are incorporated into the specification and constitute a part of the specification, show embodiments in accordance with the disclosure, and are used to explain the principle of the disclosure together with the specification.

DETAILED DESCRIPTION

The exemplary embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following exemplary embodiments do not represent all implementations consistent with the disclosure. Rather, they are merely examples of apparatuses and methods consistent with some aspects of the disclosure.

The terms used in the disclosure are only aimed to describe specific embodiments, and are not intended to limit the disclosure. The singular forms "a", "said" and "the" used in the disclosure and appended claims are also intended to include plural forms, unless the context clearly indicates other meanings. It should also be understood that the term "and/or" used herein refers to and includes any or all possible combinations of one or more associated listed items.

It should be understood that although the terms such as first, second and third may be used in the disclosure to describe various information, the information should not be limited to these terms. These terms are only used to distinguish the same type of information from each other. For example, without departing from the scope of the disclosure, the first information may also be referred to as a second information, and similarly, the second information may also be referred to as a first information. Depending on the context, the word "if" as used herein may be interpreted as "when . . . " or "upon . . . " or "in response to determine . . . ".

Figure 1:
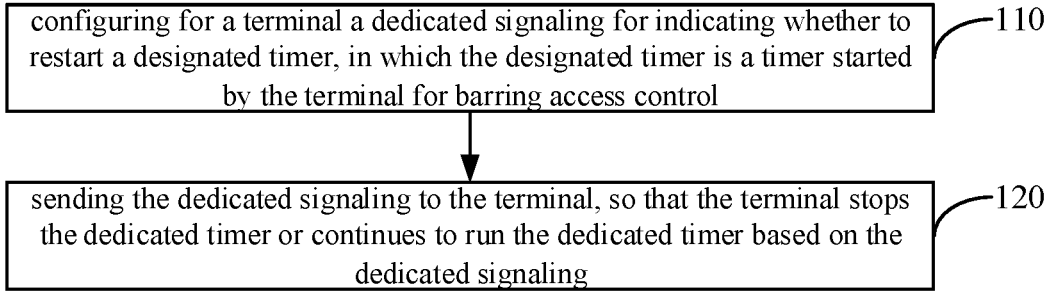
FIG. 1 is a flowchart illustrating an access control barring method according to an exemplary embodiment.
Figure 2:
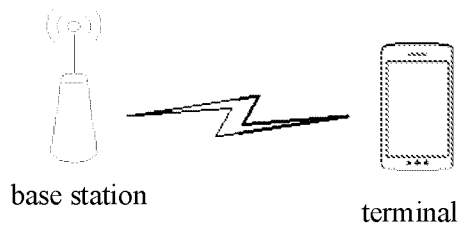
FIG. 2 is an application scenario diagram illustrating an access control barring method according to an exemplary embodiment.

FIG. 1 is a flowchart illustrating an access control barring method according to an exemplary embodiment, and FIG. 2 is an application scenario diagram illustrating an access control barring method according to an exemplary embodiment; the access control barring method may be applied to a base station; as illustrated in FIG. 1, the access control barring method may include the following blocks 110-120.

In block 110, a dedicated signaling for indicating whether to restart a designated timer is configured for a UE. The designated timer is a timer started by the UE for barring access control.

In the embodiments of the disclosure, the base station may notify the UE through the dedicated signaling whether to restart a designated timer. The designated timer is a timer that is has been started by the UE for barring the access control. In an embodiment, the above designated timer in block 110 may include a first timer or a second timer. The first timer is configured to characterize a timer that is started after the UE fails to initiate an access attempt. The second timer is configured to characterize a timer that is carried in a radio resource control RRC connection reject message received after the UE initiates an RRC connection request.

The first timer may be a T30x timer, which is an access control (AC) barring timer started after the UE fails to initiate an access attempt and corresponds to an access category. In other words, each access category corresponds to one T30x timer. For example, 64 access categories correspond to 64 T30x timers, respectively.

The second timer may be a T302 timer, which is a timer (waitTime) carried in a radio resource control RRC connection reject (RRCConnectionReject) message received after the UE initiates an RRC connection request. After the UE starts the T302 timer that is carried in the RRC connection reject message sent by the base station, the UE cannot initiate for many businesses during starting the T302 timer.

In addition, the dedicated signaling configured by the base station may correspond to working states of the UE. In an embodiment, the above dedicated signaling in block 110 may include: (1-1) an RRC connection release message configured for the UE in a connected state; or (1-2) an RRC connection reconfiguration message configured for the UE in a connected state; or (1-3) an RRC connection release message configured for the UE in an inactive state; or (1-4) an RRC connection reject message configured for the UE in an inactive state; or (1-5) an RRC connection establishment message configured for the UE in an inactive state; or (1-6) an RRC connection recovery message configured for the UE in an inactive state.

The RRC connection release message in the (1-1) may enable the UE entering from the connected state to the inactive state.

In block 120, the dedicated signaling is sent to the UE, so that the UE stops or continues to run the dedicated timer based on the dedicated signaling.

In the embodiments of the disclosure, after the base station sends the dedicated signaling to the UE, the UE may stop the dedicated timer based on the dedicated signaling if the dedicated signaling indicates to restart the dedicated timer, and the UE may continue to run the designated timer based on the dedicated signaling if the dedicated signaling indicates not to restart the dedicated timer.

The application scenario shown in FIG. 2 includes a UE and a base station. After the UE starts a designated timer for barring access control (for example, the T30x or T302 timer), if the UE receives a dedicated signaling sent by the base station for indicating whether to restart the designated timer, it may stop or continue to run the dedicated timer based on the dedicated signaling. In other words, the UE may stop the dedicated timer based on the dedicated signaling if the dedicated signaling sent by the base station indicates to restart the dedicated timer, and the UE may continue to run the designated timer based on the dedicated signaling if the dedicated signaling sent by the base station indicates not to restart the dedicated timer.

It may be seen from the above embodiments that, the dedicated signaling for indicating whether to restart a dedicated timer is configured for the UE, in which the dedicated timer is a timer started by the UE for barring the access control, and the dedicated signaling is sent to the UE, so that the UE may stops or continues to run the dedicated timer based on the dedicated signaling sent by the base station after starting the designated timer for barring access control, thereby improving the access control barring reliability.

Figure 3:
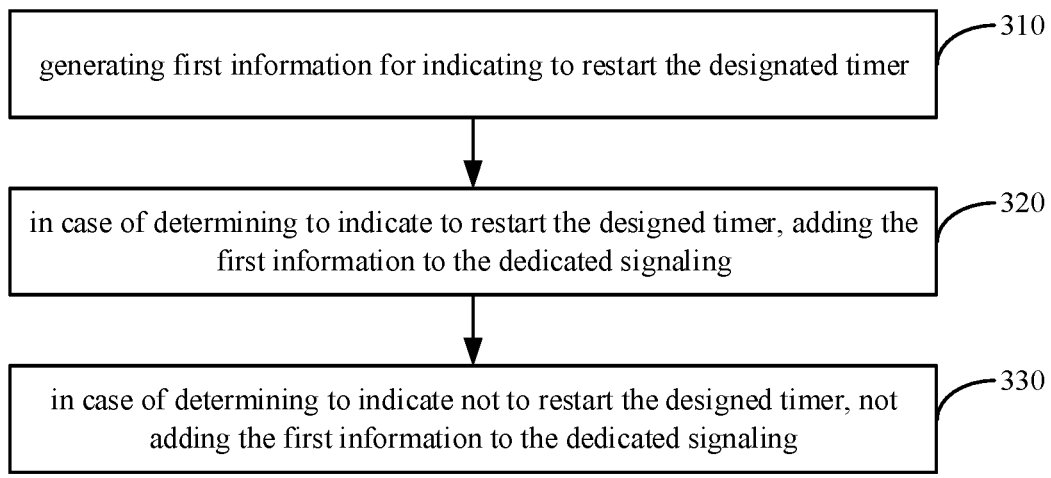
FIG. 3 is a flowchart illustrating another access control barring method according to an exemplary embodiment.

FIG. 3 is a flowchart illustrating another access control barring method according to an exemplary embodiment. The access control barring method may be applied to a base station and established based on the method illustrated in FIG. 1, when block 110 is performed, the following blocks 310-330 may be included as illustrated in FIG. 3.

In block 310, first information for indicating to restart the designated timer is generated.

In the embodiments of the disclosure, the first information is the indication information specifically configured to characterize restarting the designated timer. If the first information is included in the dedicated signaling, it is manifested that the base station requires indicating to restart the designated timer; if the first information is not included in the dedicated signaling, it is manifested that the base station requires indicating not to restart the designated timer.

In block 320, in response to determining to indicate to restart the designed timer, the first information is added to the dedicated signaling.

In block 330, in response to determining to indicate not to restart the designed timer, the first information is not added to the dedicated signaling.

It may be seen from the above embodiments that, the first information for indicating to restart the designed timer may be generated and added to the dedicated signaling in response to determining to indicate to restart the designed timer, and the first information is not added to the dedicated signaling in response to determining to indicate not to restart the designed timer, thereby improving the indicating accuracy of dedicated signaling.

Figure 4:
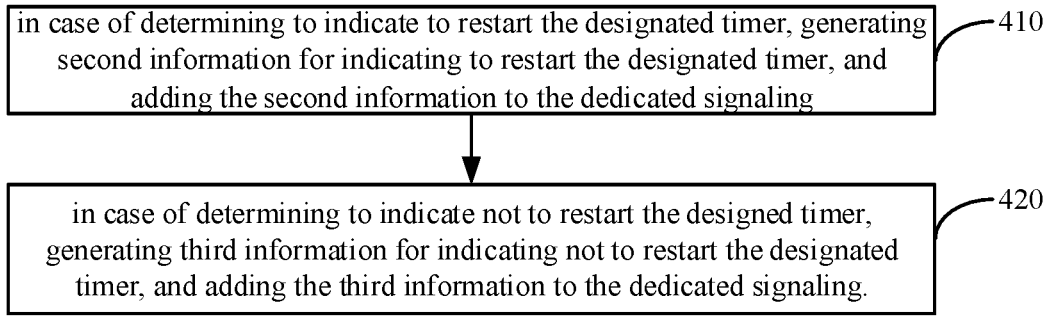
FIG. 4 is a flowchart illustrating another access control barring method according to an exemplary embodiment.

FIG. 4 is a flowchart illustrating another access control barring method according to an exemplary embodiment. The access control barring method may be applied to a base station and established based on the method illustrated in FIG. 1. When block 110 is performed, the following blocks 410-420 may be included as illustrated in FIG. 4.

In block 410, in response to determining to indicate to restart the designed timer, second information for indicating to restart the designed timer is generated and added to the dedicated signaling.

In the embodiments of the disclosure, the second information is the indication information specifically configured to characterize restarting the designed timer. If the first information is included in the dedicated signaling, it is manifested that the base station requires indicating to restart the designed timer. For example, the second information is set as 1.

In block 420, in response to determining to indicate not to restart the designed timer, third information for indicating not to restart the designed timer is generated and added to the dedicated signaling.

In the embodiments of the disclosure, the third information is the indication information specifically configured to characterize restarting the designed timer. If the third information is included in the dedicated signaling, it is manifested that the base station requires indicating not to restart the designated timer. For example, the third information is set as 0.

It may be seen from the above embodiments that, in response to determining to indicate to restart the designed timer, second information for indicating to restart the designated timer may be generated and added to the dedicated signaling; in response to determining to indicate not to restart the designed timer, third information for indicating not to restart the designated timer may be generated and added to the dedicated signaling, thereby enriching the indicating diversity of dedicated signaling and also improving the indicating efficiency of dedicated signaling.

Figure 5:
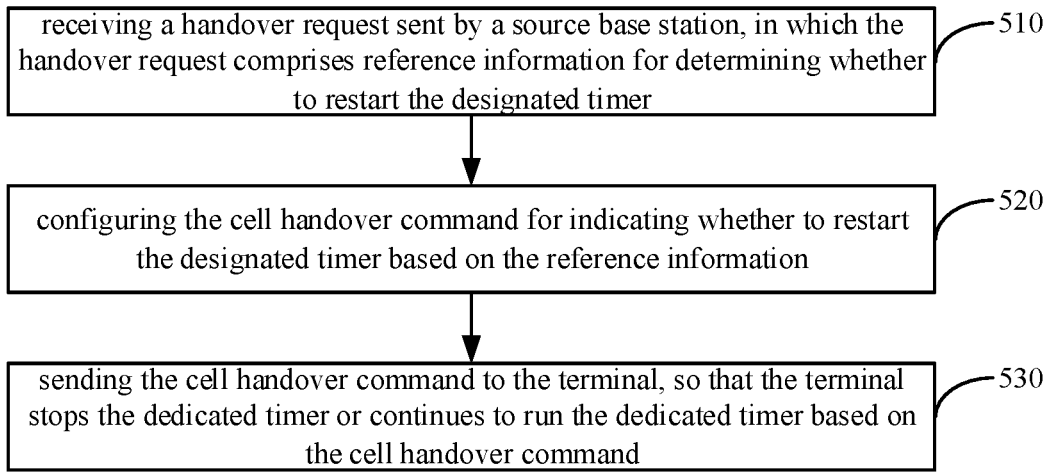
FIG. 5 is a flowchart illustrating another access control barring method according to an exemplary embodiment.

FIG. 5 is a flowchart illustrating another access control barring method according to an exemplary embodiment. The access control barring method may be applied to a base station and established based on the method illustrated in FIG. 1. The base station is a target base station and the dedicated signaling includes a cell handover command. When block 110 is performed, the following blocks 510-520 may be included as illustrated in FIG. 5.

In block 510, a handover request sent by a source base station is received. The handover request includes reference information for determining whether to restart the designated timer. and In the embodiments of the disclosure, the handover request is sent by the source base station to the target base station to perform a cell handover. In order to facilitate configuring by the target base station for the UE the cell handover command which indicates whether to restart the designated timer, the source base station may send its own information related to the UE to the target base station as reference information.

In an embodiment, the above reference information in block 510 may include (2-1) a duration of a timer configured for the UE by the source base station for barring the access control and/or (2-2) a load of the source base station.

After the target base station learns the load of the source base station in (2-2), a relationship between the load of the source base station and the load of the target base station may be compared. For example, if the load of the target base station is not much different from the load of the source base station, or if the load of the target base station is heavier than the load of the source base station, the target base station may indicate the UE not to restart the dedicated timer, otherwise the target base station may instruct the UE to restart the dedicated timer. The designated timer may refer to a timer that has been started by the UE for barring the access control.

In block 520, the cell handover command for indicating whether to restart the designated timer is configured based on the reference information.

In the embodiments of the disclosure, when the cell handover command for indicating whether to restart the designated timer is configured based on the reference information, there are many specific configuration manners, including but not limited to the following Manner 1 (which is same as the embodiment illustrated in FIG. 3) and Manner 2 (which is same as the embodiment illustrated in FIG. 4).

Manner 1:
(3-1) first information for indicating to restart the designated timer is generated.
(3-2) in response to determining to indicate to restart the designed timer, the first information is added to the cell handover command.
(3-3) in response to determining to indicate not to restart the designed timer, the first information is not added to the cell handover command.

Manner 2:
(4-1) In response to determining to indicate to restart the designed timer, second information for indicating to restart the designated timer is generated and added to the cell handover command.
(4-2) In response to determining to indicate not to restart the designed timer, third information for indicating not to restart the designated timer is generated and added to the cell handover command.

Correspondingly, when block 120 is performed, the following block 530 may be included as illustrated in FIG. 5.

In block 530, the cell handover command is sent to the UE, so that the UE stops or continues to run the designated timer based on the cell handover command.

It may be seen from the above embodiments that, during the cell handover, the cell handover command for indicating whether to restart the designated timer may be configured based on the reference information provided by the base station and sent to the UE, so that the UE may stop or continue to run the dedicated timer based on the cell handover command sent by the target base station. In this way, barring the access control is realized during the cell handover, the application range of barring the access control is expanded, and the access control barring reliability is also improved.

Figure 6:
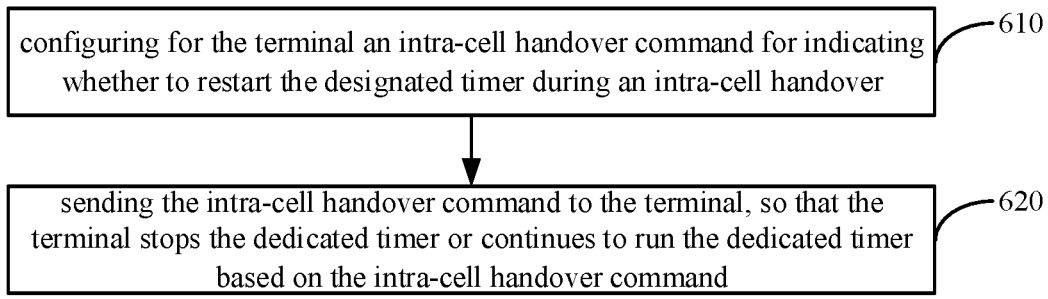
FIG. 6 is a flowchart illustrating another access control barring method according to an exemplary embodiment.

FIG. 6 is a flowchart illustrating another access control barring method according to an exemplary embodiment. The access control barring method may be applied to a base station and established based on the method illustrated in FIG. 1. The dedicated signaling includes an intra-cell handover command. When block 110 is performed, the following block 610 may be included as illustrated in FIG. 6.

In block 610, the intra-cell handover command for indicating whether to restart the designated timer is configured for the UE during an intra-cell handover.

In the embodiments of the disclosure, it is possible to indicate the UE whether to restart the designated timer through the intra-cell handover command during the intra-cell handover. For example, if the load of the cell is unchanged, the UE may be indicated not to restart the designated timer through the intra-cell handover command during the intra-cell handover.

In addition, when the intra-cell handover command for indicating whether to restart the designated timer is configured for the UE, there are many specific configuration manners, including but not limited to the following Manner 1 (which is same as the embodiment illustrated in FIG. 3) and Manner 2 (which is same as the embodiment illustrated in FIG. 4).

Manner 1:

(5-1) first information for indicating to restart the designated timer is generated.

(5-2) in response to determining to indicate to restart the designed timer, the first information is added to the intra-cell handover command.

(3-3) in response to determining to indicate not to restart the designed timer, the first information is not added to the intra-cell handover command.

Manner 2:

(6-1) In response to determining to indicate to restart the designed timer, second information for indicating to restart the designated timer is generated and added to the intra-cell handover command.

(6-2) In response to determining to indicate not to restart the designed timer, third information for indicating not to restart the designated timer is generated and added to the intra-cell handover command.

Correspondingly, when block 120 is performed, the following block 620 may be included as illustrated in FIG. 6.

In block 620, the intra-cell handover command is sent to the UE, so that the UE stops or continues to run the designated timer based on the intra-cell handover command.

It may be seen from the above embodiments that, during the intra-cell handover, the intra-cell handover command for indicating whether to restart the designated timer may be configured for terminal the base station and sent to the UE, so that the UE may stop or continue to run the dedicated timer based on the intra-cell handover command. In this way, barring the access control is realized during the cell handover, the application range of barring the access control is expanded, and the accuracy of barring the access control is also improved.

Figure 7:
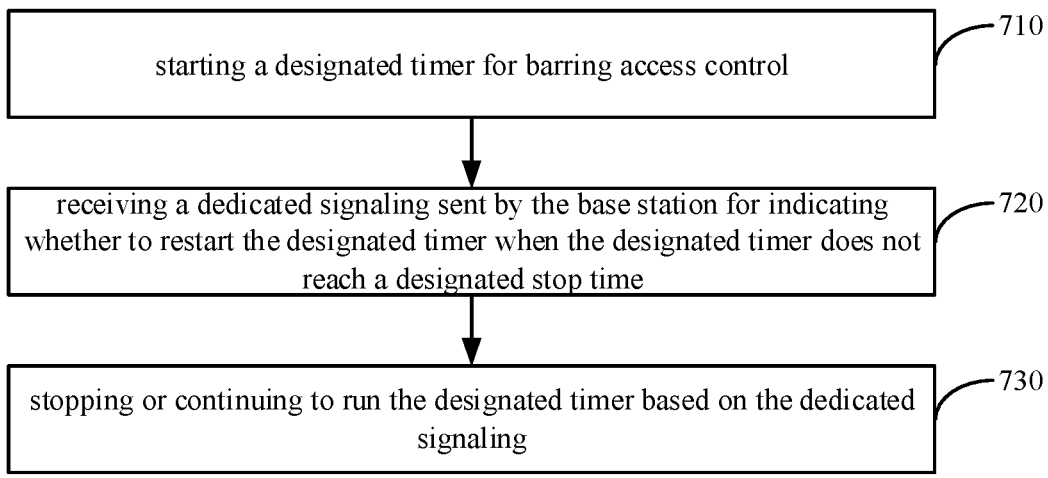
FIG. 7 is a flowchart illustrating an access control barring method according to an exemplary embodiment.

FIG. 7 is a flowchart illustrating an access control barring method according to an exemplary embodiment. The access control barring method may be applied to a UE. As illustrated in FIG. 7, the access control barring method may include the following blocks 710-730.

In block 710, a designated timer for barring access control is started.

In the embodiments of the disclosure, the designated timer in the AC barring mechanism may refer to a timer that bars the UE from continuing to initiate calls. Moreover, there are many types of designated timers. Some timers may be the ones actively started by the UE, and some timers may be the ones started by the UE according to the configuration of the base station.

In an embodiment, the above designated timer in block 710 may include a first timer or a second timer. The first timer is configured to characterize a timer that is started after the UE fails to initiate an access attempt. The second timer is configured to characterize a timer that is carried in a radio resource control RRC connection reject message received after the UE initiates an RRC connection request.

The first timer may be a T30x timer, which is an AC (access control) barring timer started after the UE fails to initiate an access attempt and corresponds to an access category. In other words, each access category corresponds to one T30x timer. For example, 64 access categories correspond to 64 T30x timers, respectively. The second timer may be a T302 timer, which is a timer (waitTime) carried in a radio resource control RRC connection reject (RRCConnectionReject) message received after the UE initiates an RRC connection request. After the UE starts the T302 timer that is carried in the RRC connection reject message sent by the base station, the UE cannot initiate for many businesses during starting the T302 timer.

In block 720, a dedicated signaling sent by the base station for indicating whether to restart the designated timer is received when the designated timer does not reach a designated stop time.

In the embodiments of the disclosure, the base station may notify the UE through the dedicated signaling whether to restart a designated timer. the dedicated signaling configured by the base station may correspond to working states of the UE. In an embodiment, the above dedicated signaling in block 110 may include: (7-1) an RRC connection release message configured for the UE in a connected state; or (7-2) an RRC connection reconfiguration message configured for the UE in a connected state; or (7-3) an RRC connection release message configured for the UE in an inactive state; or (7-4) an RRC connection reject message configured for the UE in an inactive state; or (7-5) an RRC connection establishment message configured for the UE in an inactive state; or (7-6) an RRC connection recovery message configured for the UE in an inactive state.

The RRC connection release message in the (7-1) may enable the UE entering from the connected state to the inactive state.

In block 730, the designated timer is stopped or continued to run based on the dedicated signaling.

In the embodiments of the disclosure, the UE may stop the dedicated timer based on the dedicated signaling if the dedicated signaling indicates to restart the dedicated timer, and the UE may continue to run the designated timer based on the dedicated signaling if the dedicated signaling indicates not to restart the dedicated timer.

In addition, when the UE stops or continues to run the dedicated timer based on the dedicated signaling, the implementation manners correspond to the configuration manners of the base station, including but not limited to the following Manner 1 and Manner 2.

Manner 1:

(8-1) if first information for indicating to restart the designated timer is included in the designated signaling, the designated timer is stopped based on the first information.

(8-2) if the first information is not included in the dedicated signaling, the designated timer is continued to run.

Manner 2:

(9-1) if second information for indicating to restart the designated timer is included in the dedicated signaling, the designated timer is stopped based on the second information.

(9-2) if third information for indicating not to restart the designated timer is included in the dedicated signaling, the designated timer is continued to run based on the third information.

It may be seen from the above embodiments that, after the designated timer for barring access control is started, the designated timer may be stopped or continued to run based on the designated signaling sent by the base station, thereby improving the access control barring reliability.

Figure 8:
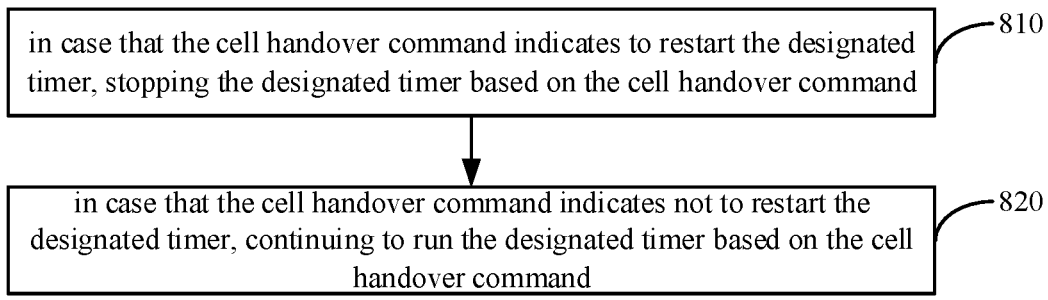
FIG. 8 is a flowchart illustrating another access control barring method according to an exemplary embodiment.

FIG. 8 is a flowchart illustrating another access control barring method according to an exemplary embodiment. The access control barring method may be applied to a UE and established based on the method illustrated in FIG. 7. The dedicated signaling includes a cell handover command; when block 720 is performed, the following blocks 810-820 may be included as illustrated in FIG. 8.

In block 810, in case that the cell handover command indicates to restart the designated timer, the designated timer is stopped based on the cell handover command.

In the embodiments of the disclosure, the above implementation manners shown in (8-1) to (8-2) or (9-1) to (9-2) may be used to determine what the cell handover command indicates, i.e., whether to restart the designated timer.

In block 820, in case that the cell handover command indicates not to restart the designated timer, the designated timer is continued to run based on the cell handover command.

It may be seen from the above embodiments that, when the cell handover command indicates to restart the designated timer, the designated timer may be stopped based on the cell handover command; when the cell handover command indicates not to restart the designated timer, the designated timer may be continued to run based on the cell handover command. In this way, barring the access control is realized during the cell handover, the application range of barring the access control is expanded, and the access control barring reliability is also improved.

Figure 9:
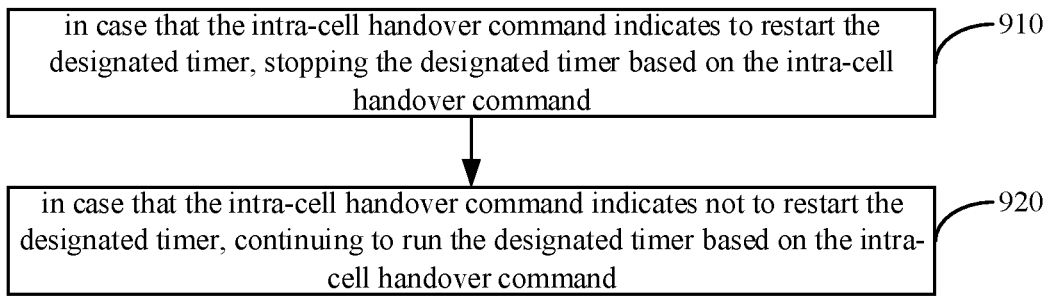
FIG. 9 is a flowchart illustrating another access control barring method according to an exemplary embodiment.

FIG. 9 is a flowchart illustrating another access control barring method according to an exemplary embodiment. The access control barring method may be applied to a UE and established based on the method illustrated in FIG. 7. When block 720 is performed, the following blocks 910-920 may be included as illustrated in FIG. 9.

In block 910, in case that the intra-cell handover command indicates to restart the designated timer, the designated timer is stopped based on the intra-cell handover command.

In the embodiments of the disclosure, the above implementation manners shown in (8-1) to (8-2) or (9-1) to (9-2) may be used to determine what the intra-cell handover command indicates, i.e., whether to restart the designated timer.

In block 920, in case that the intra-cell handover command indicates not to restart the designated timer, the designated timer is continued to run based on the intra-cell handover command.

It may be seen from the above embodiments that, when the intra-cell handover command indicates to restart the designated timer, the designated timer may be stopped based on the intra-cell handover command; when the intra-cell handover command indicates not to restart the designated timer, the designated timer may be continued to run based on the intra-cell handover command. In this way, barring the access control is realized during the intra-cell handover, the application range of barring the access control is expanded, and the accuracy of barring the access control is also improved.

Corresponding to the above embodiment of the access control barring methods, the disclosure also provides embodiments of the access control barring apparatuses.

Figure 10:
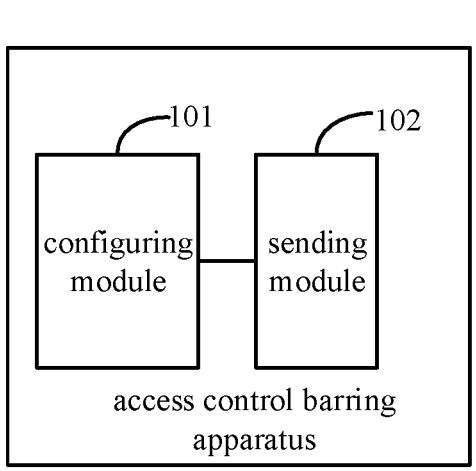
FIG. 10 is a block diagram illustrating an access control barring apparatus according to an exemplary embodiment.

FIG. 10 is a block diagram illustrating an access control barring apparatus according to an exemplary embodiment. The apparatus is applied to a base station and configured to execute the access control barring method illustrated in FIG. 1. As illustrated in FIG. 10, the access control barring apparatus may include a configuring module 101 and a sending module 102.

The configuring module 101 is configured to configure for a UE a dedicated signaling for indicating whether to restart a designated timer. The designated timer is a timer started by the UE for barring the access control.

The barring module 102 is configured to send the dedicated signaling to the UE, so that the UE stops or continues to run the dedicated timer based on the dedicated signaling.

It may be seen from the above embodiments that, the dedicated signaling for indicating whether to restart a dedicated timer is configured for the UE, in which the dedicated timer is a timer started by the UE for barring the access control, and the dedicated signaling is sent to the UE, so that the UE may stops or continues to run the dedicated timer based on the dedicated signaling sent by the base station after starting the designated timer for barring access control, thereby improving the access control barring reliability.

In an embodiment, based on the apparatus illustrated in FIG. 10, the designated timer may include a first timer or a second timer. The first timer is configured to characterize a timer that is started after the UE fails to initiate an access attempt. The second timer is configured to characterize a timer that is carried in a radio resource control RRC connection reject message received after the UE initiates an RRC connection request.

In an embodiment, based on the access control barring apparatus as illustrated in FIG. 10, the above dedicated signaling includes: an RRC connection release message configured for the UE in a connected state; or an RRC connection reconfiguration message configured for the UE in a connected state; or an RRC connection release message configured for the UE in an inactive state; or an RRC connection reject message configured for the UE in an inactive state; or an RRC connection establishment message configured for the UE in an inactive state; or an RRC connection recovery message configured for the UE in an inactive state.

Figure 11:
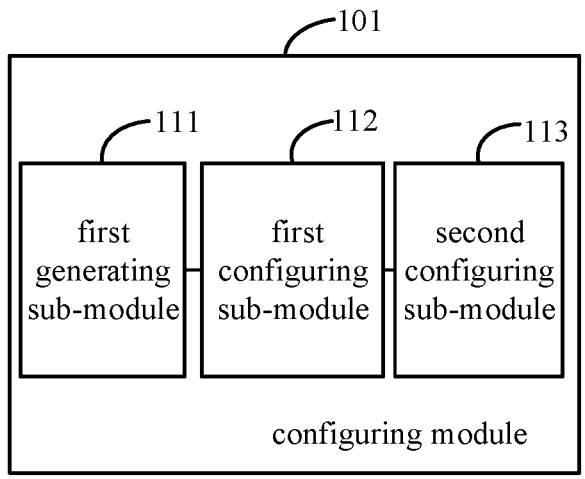
FIG. 11 is a block diagram illustrating another access control barring apparatus according to an exemplary embodiment.

In an embodiment, based on the access control barring apparatus as illustrated in FIG. 10, the configuring module includes a first generating sub-module 111, a first configuring sub-module 112 and a second configuring sub-module 113 as illustrated in FIG. 11.

The first generating sub-module 111 is configured to generate first information for indicating to restart the designated timer.

The first configuring sub-module 112 is configured to add the first information to the dedicated signaling in response to determining to indicate to restart the designed timer.

The second configuring sub-module 113 is configured to not add the first information to the dedicated signaling in response to determining to indicate not to restart the designed timer.

It may be seen from the above embodiments that, the first information for indicating to restart the designated timer may be generated and added to the dedicated signaling in response to determining to indicate to restart the designed timer, and the first information is not added to the dedicated signaling in response to determining to indicate not to restart the designed timer, thereby improving the indicating accuracy of dedicated signaling.

Figure 12:
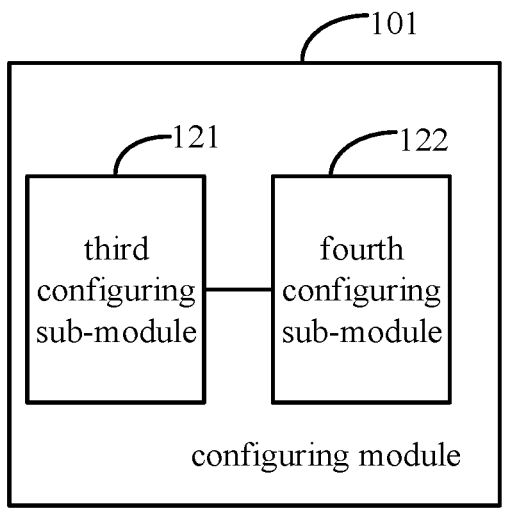
FIG. 12 is a block diagram illustrating another access control barring apparatus according to an exemplary embodiment.

In an embodiment, based on the apparatus illustrated in FIG. 10, the configuring module 101 includes a third configuring sub-module 121 and a fourth configuring sub-module 122 as illustrated in FIG. 12.

The third configuring sub-module 121 is configured to generate second information for indicating to restart the designated timer and add the second information to the dedicated signaling in response to determining to indicate to restart the designed timer.

The fourth configuring sub-module 122 is configured to generate third information for indicating not to restart the designated timer and add the third information to the dedicated signaling in response to determining to indicate not to restart the designed timer.

It may be seen from the above embodiments that, in response to determining to indicate to restart the designed timer, second information for indicating to restart the designated timer may be generated and added to the dedicated signaling; in response to determining to indicate not to restart the designed timer, third information for indicating not to restart the designated timer may be generated and added to the dedicated signaling, thereby enriching the indicating diversity of dedicated signaling and also improving the indicating efficiency of dedicated signaling.

Figure 13:
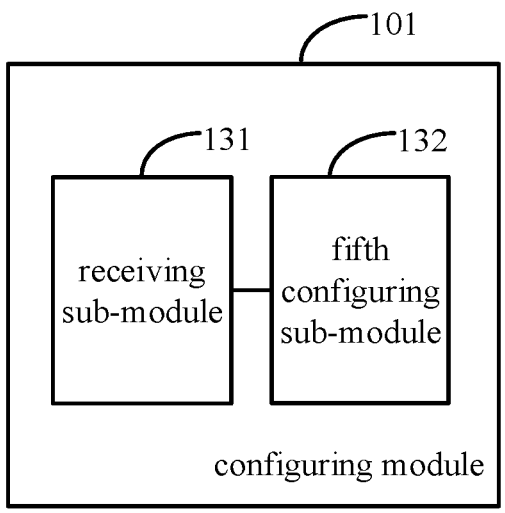
FIG. 13 is a block diagram illustrating another access control barring apparatus according to an exemplary embodiment.

In an embodiment, based on the apparatus illustrated in FIG. 10, the base station is a target base station; the dedicated signaling includes a cell handover command; the configuring module 101 includes a receiving sub-module 131 and a fifth configuring sub-module 132 as illustrated in FIG. 13.

The receiving sub-module 131 is configured to receive a handover request sent by a source base station, in which the handover request includes reference information for determining whether to restart the designated timer.

The fifth configuring sub-module 132 is configured to configure the cell handover command for indicating whether to restart the designated timer based on the reference information.

It may be seen from the above embodiments that, during the cell handover, the cell handover command for indicating whether to restart the designated timer may be configured based on the reference information provided by the base station and sent to the UE, so that the UE may stop or continue to run the dedicated timer based on the cell handover command sent by the target base station. In this way, barring the access control is realized during the cell handover, the application range of barring the access control is expanded, and the access control barring reliability is also improved.

In an embodiment, based on the apparatus illustrated in FIG. 13, the reference information includes a duration of a timer configured for the UE by the source base station for barring the access control, and/or a load of the source base station.

Figure 14:
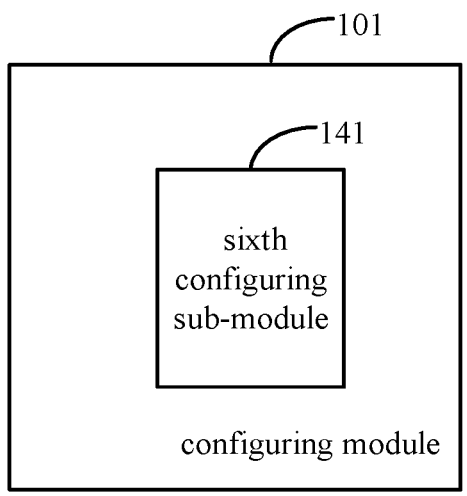
FIG. 14 is a block diagram illustrating another access control barring apparatus according to an exemplary embodiment.

In an embodiment, based on the apparatus illustrated in FIG. 10, the dedicated signaling includes an intra-cell handover command; and the configuring module 101 includes a sixth configuring sub-module 141 as illustrated in FIG. 14.

The sixth configuring sub-module 141 is configured to configure for the UE the intra-cell handover command for indicating whether to restart the designated timer during an intra-cell handover.

It may be seen from the above embodiments that, during the intra-cell handover, the intra-cell handover command for indicating whether to restart the designated timer may be configured for terminal the base station and sent to the UE, so that the UE may stop or continue to run the dedicated timer based on the intra-cell handover command. In this way, barring the access control is realized during the cell handover, the application range of barring the access control is expanded, and the accuracy of barring the access control is also improved.

Figure 15:
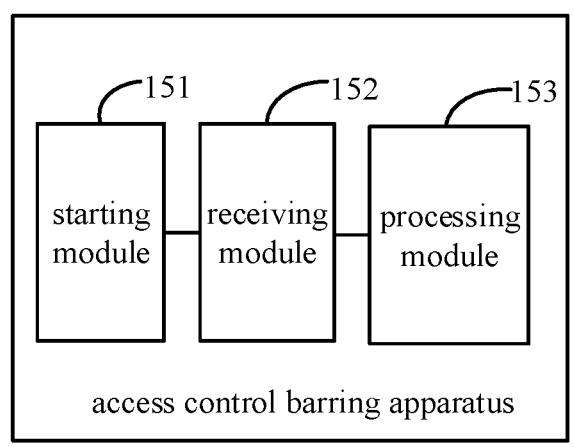
FIG. 15 is a block diagram illustrating an access control barring apparatus according to an exemplary embodiment.

FIG. 15 is a block diagram illustrating an access control barring apparatus according to an exemplary embodiment. The apparatus is applied to a base station and configured to execute an access control barring method as illustrated in FIG. 7. The access control barring apparatus may include a starting module 151, a receiving module 152 and a processing module 153 as illustrated in FIG. 15.

The starting module 151 is configured to start a designated timer for barring access control.

The receiving module 152 is configured to receive a dedicated signaling sent by the base station for indicating whether to restart the designated timer when the designated timer does not reach a designated stop time.

The processing module 153 is configured to stop or continue to run the designated timer based on the dedicated signaling.

It may be seen from the above embodiments that, after the designated timer for barring access control is started, the designated timer may be stopped or continued to run based on the designated signaling sent by the base station, thereby improving the access control barring reliability.

In an embodiment, based on the apparatus illustrated in FIG. 15, the designated timer may include a first timer or a second timer. The first timer is configured to characterize a timer that is started after the UE fails to initiate an access attempt. The second timer is configured to characterize a timer that is carried in a radio resource control RRC connection reject message received after the UE initiates an RRC connection request.

In an embodiment, based on the apparatus illustrated in FIG. 15, the designated signaling includes: an RRC connection release message configured for the UE in a connected state; or an RRC connection reconfiguration message configured for the UE in a connected state; or an RRC connection release message configured for the UE in an inactive state; or an RRC connection reject message configured for the UE in an inactive state; or an RRC connection establishment message configured for the UE in an inactive state; or an RRC connection recovery message configured for the UE in an inactive state.

Figures 16, 17:
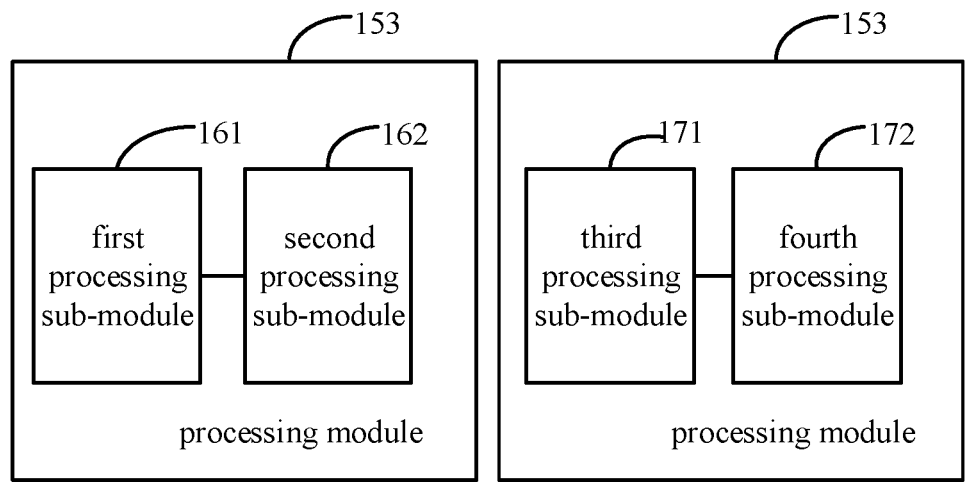
FIG. 16 is a block diagram illustrating another access control barring apparatus according to an exemplary embodiment.
FIG. 17 is a block diagram illustrating another access control barring apparatus according to an exemplary embodiment.

In an embodiment, based on the apparatus illustrated in FIG. 15, the processing module 153 includes a first processing sub-module 161 and a second processing sub-module 162 as illustrated in FIG. 16.

The first processing sub-module 161 is configured to stop the designated timer based on the first information in case that first information for indicating to restart the designated timer is included in the dedicated signaling.

The second processing sub-module 162 is configured to continue to run the designated timer in case that the first information is not included in the dedicated signaling.

In an embodiment, based on the apparatus illustrated in FIG. 15, the processing module 153 includes a third processing sub-module 171 and a fourth processing sub-module 172 as illustrated in FIG. 17.

The third processing sub-module 171 is configured to stop the designated timer based on the second information in case that second information for indicating to restart the designated timer is included in the dedicated signaling.

The fourth processing sub-module 172 is configured to continue to run the designated timer based on the third information in case that third information for indicating not to restart the designated timer is included in the dedicated signaling.

Figures 18, 19:
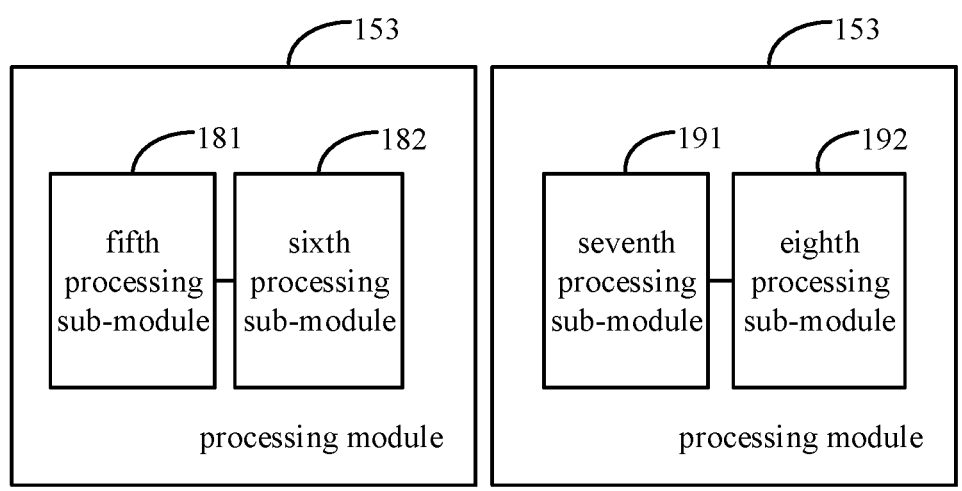
FIG. 18 is a block diagram illustrating another access control barring apparatus according to an exemplary embodiment.
FIG. 19 is a block diagram illustrating another access control barring apparatus according to an exemplary embodiment.

In an embodiment, based on the apparatus illustrated in FIG. 15, the base station is a target base station, the dedicated signaling includes a cell handover command; and the processing module 153 includes a fifth processing sub-module 181 and a sixth processing sub-module 182 as illustrated in FIG. 18.

The fifth processing sub-module 181 is configured to stop the designated timer based on the cell handover command in case that the cell handover command indicates to restart the designated timer.

The sixth processing sub-module 182 is configured to continue to run the designated timer based on the cell handover command in case that the cell handover command indicates not to restart the designated timer.

It may be seen from the above embodiments that, when the cell handover command indicates to restart the designated timer, the designated timer may be stopped based on the cell handover command; when the cell handover command indicates not to restart the designated timer, the designated timer may be continued to run based on the cell handover command. In this way, barring the access control is realized during the cell handover, the application range of barring the access control is expanded, and the access control barring reliability is also improved.

In an embodiment, based on the apparatus illustrated in FIG. 15, the dedicated signaling includes an intra-cell handover command; and the processing module 153 includes a seventh processing sub-module 191 and an eighth processing sub-module 192 as illustrated in FIG. 19.

It may be seen from the above embodiments that, when the intra-cell handover command indicates to restart the designated timer, the designated timer may be stopped based on the intra-cell handover command; when the intra-cell handover command indicates not to restart the designated timer, the designated timer may be continued to run based on the intra-cell handover command. In this way, barring the access control is realized during the intra-cell handover, the application range of barring the access control is expanded, and the accuracy of barring the access control is also improved.

As for the apparatus embodiments that basically correspond to the method embodiments, the relevant parts may refer to the descriptions on parts of the method embodiments. The apparatus embodiments described above are merely illustrative. The units described above as separate components may or may not be physically separated, and the components displayed as units may or may not be physical units, that is, they may be located in one place or may be distributed to multiple network units. Some or all of the modules can be selected according to actual needs to achieve the objectives of the solutions of the disclosure. Those skilled in the art may understand and implement them without creative work.

The disclosure also provides a non-transitory computer-readable storage medium on which a computer program is stored, and the computer program is configured to execute the access control barring method described in any one of FIG. 1 to FIG. 6.

The disclosure also provides a non-transitory computer-readable storage medium on which a computer program is stored, and the computer program is configured to execute the access control barring method described in any one of FIG. 7 to FIG. 9.

The disclosure also provides an access control barring device. The device is applied to a base station and includes a processor and a memory for storing instructions executable by the processor.

The processor is configured to configure for a UE a dedicated signaling for indicating whether to restart a designated timer, in which the designated timer is a timer started by the terminal for barring the access control; and send the dedicated signaling to the terminal, so that the terminal stops or continues to run the dedicated timer based on the dedicated signaling.

Figure 20:
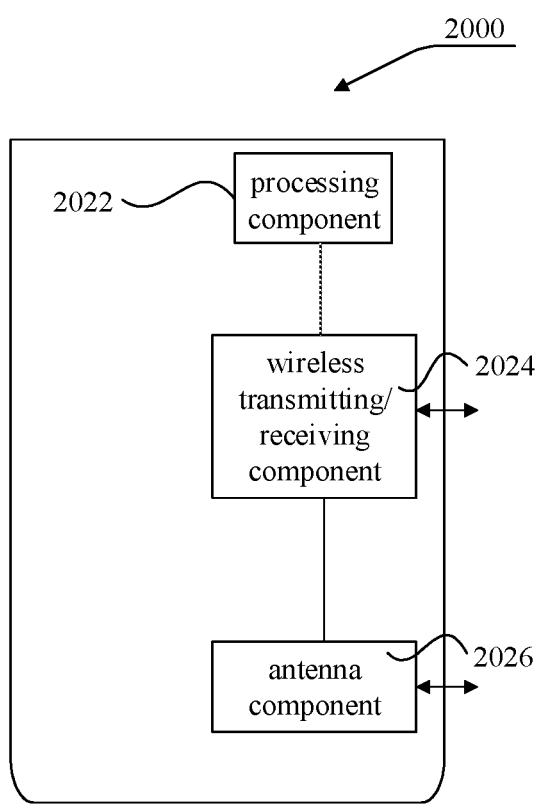
FIG. 20 is a structural schematic diagram illustrating an access control barring device according to an exemplary embodiment.

As illustrated in FIG. 20, it is a structural schematic diagram illustrating an access control barring device according to an exemplary embodiment. The device 2000 may be provided as a base station. Referring to FIG. 20, the device 2000 includes a processing component 2022, a wireless transmitting/receiving component 2024, an antenna component 2026, and a signal processing part specific to a wireless interface. The processing component 2022 may further include one or more processors.

One of the processors in the processing component 2022 may be configured to execute any of the access control barring methods described above.

The disclosure also provides an access control barring device. The device is applied to a UE and includes a processor and a memory for storing instructions executable by the processor.

The processor is configured to start a designated timer for barring access control; receive a dedicated signaling sent by the base station for indicating whether to restart the designated timer when the designated timer does not reach a designated stop time; and stop or continue to run the designated timer based on the dedicated signaling.

Figure 21:
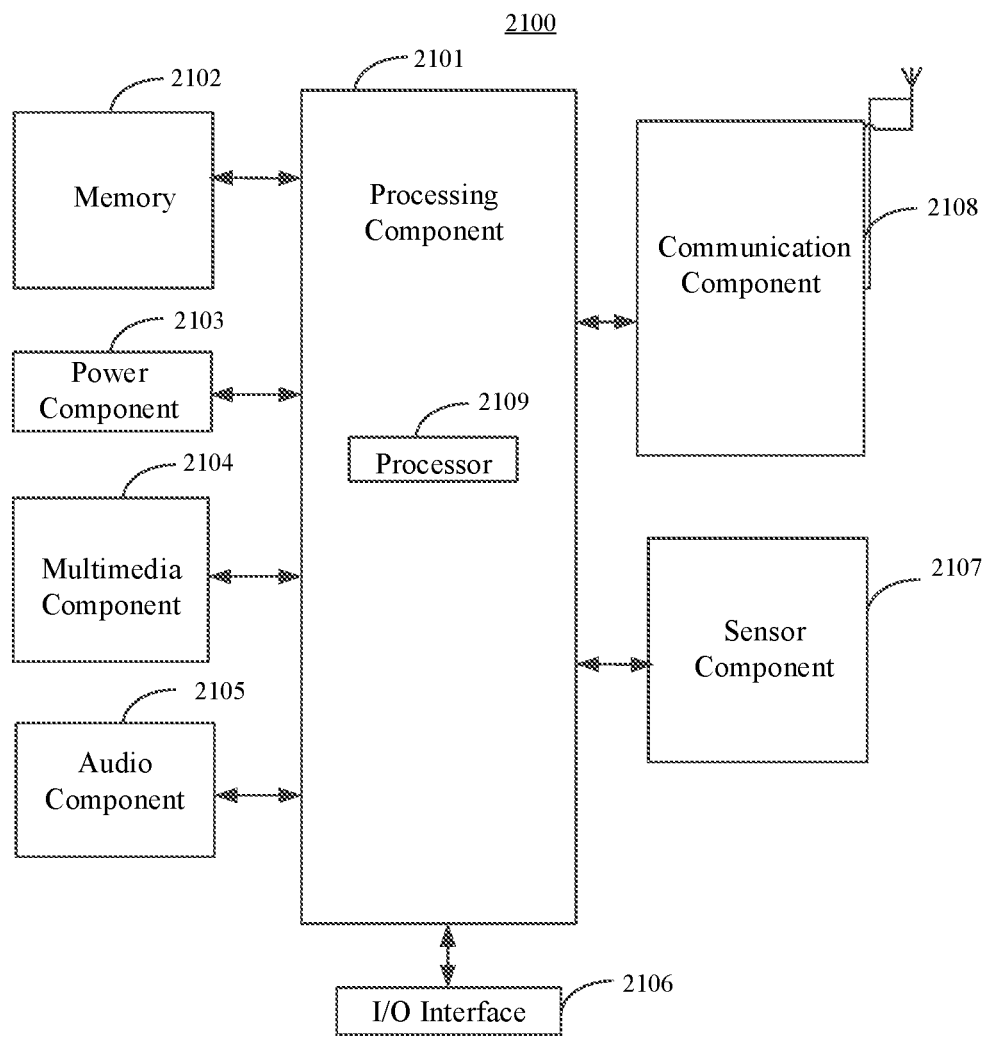
FIG. 21 is a structural schematic diagram illustrating an access control barring device according to an exemplary embodiment.

FIG. 21 is a structural schematic diagram illustrating an access control barring device according to an exemplary embodiment. As illustrated in FIG. 21, the access control barring device 2100 is shown according to an exemplary embodiment. The device 2100 may be a computer, a mobile phone, a digital broadcasting terminal, a messaging device, a game console, a tablet device, or a medical device, a fitness equipment, a personal digital assistant and other terminals.

Referring to FIG. 21, the apparatus 2100 may include one or more of the following components: a processing component 2101, a memory 2102, a power supply component 2103, a multimedia component 2104, an audio component 2105, an input/output (I/O) interface 2106, a sensor component 2107, and a communication component 2108.

The processing component 2101 typically controls the overall operations of the device 2100, such as the operations associated with display, telephone calls, data communications, camera operations, and recording operations. The processing component 2101 may include one or more processors 2109 to execute instructions to perform all or part of the steps of the above described methods. Moreover, the processing component 2101 may include one or more modules which facilitate the interaction between the processing component 2101 and other components. For example, the processing component 2101 may include a multimedia module to facilitate the interaction between the multimedia component 2104 and the processing component 2101.

The memory 2102 is configured to store various types of data to support operations in the device 2100. Examples of such data include instructions for any application or method operating on the device 2100, contact data, phone book data, messages, pictures, videos, etc. The memory 2102 may be implemented by any type of volatile or nonvolatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 2103 provides power to various components of the device 2100. The power supply component 2103 may include a power management system, one or more power sources, and other components associated with the generation, management, and distribution of power for the device 2100.

The multimedia component 2104 includes a screen that provides an output interface between the device 2100 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some embodiments, the multimedia component 2104 includes a front camera and/or a rear camera. The front camera and the rear camera may receive an external multimedia datum while the device 2100 is in an operation mode, such as a photographing mode or a video mode. Each of the front camera and rear camera may be a fixed optical lens system or have focus and optical zoom capability.

The audio component 2105 is configured to output and/or input audio signals. For example, the audio component 2105 includes a microphone (MIC) configured to receive an external audio signal when the device 2100 is in an operation mode, such as a call mode, a recording mode, and a voice recognition mode. The received audio signal may be further stored in the memory 2102 or transmitted via the communication component 2108. In some embodiments, the audio component 2105 further includes a speaker to output audio signals.

The I/O interface 2106 provides an interface between the processing component 2101 and the peripheral interface module. The peripheral interface module may be a keyboard, a click wheel, a button, and the like. These buttons may include but are not limited to, a home button, a volume button, a starting button, and a locking button.

The sensor component 2107 includes one or more sensors for providing the device 2100 with various aspects of state evaluation. For example, the sensor component 2107 may detect an open/closed status of the device 2100, relative positioning of components, e.g., the display and the keypad, of the device 2100, a change in position of the device 2100 or a component of the device 2100, a presence or absence of user contact with the device 2100, an orientation or an acceleration/deceleration of the device 2100, and a change in temperature of the device 2100. The sensor component 2107 may include a proximity sensor configured to detect the presence of nearby objects without any physical contact. The sensor component 2107 may also include a light sensor, such as a CMOS or CCD image sensor, for use in imaging applications. In some embodiments, the sensor component 2107 may also include an accelerometer sensor, a gyroscope sensor, a magnetic sensor, a pressure sensor, or a temperature sensor.

The communication component 2108 is configured to facilitate communication, wired or wirelessly, between the device 2100 and other devices. The device 2100 may access a wireless network based on a communication standard, such as WiFi, 2G or 3G, or a combination thereof. In one exemplary embodiment, the communication component 2108 receives a broadcast signal or broadcast associated information from an external broadcast management system via a broadcast channel. In one exemplary embodiment, the communication component 2108 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the device 2100 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the above methods.

In exemplary embodiments, there is also provided a non-transitory computer-readable storage medium including instructions, such as the memory 2102, executable by the processor 2109 in the device 2100, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the device 2100 is caused to execute any one of access control barring methods described above.

It will be appreciated that the present invention is not limited to the exact construction that has been described above and illustrated in the accompanying drawings, and that various modifications and changes can be made without departing from the scope thereof.

What is claimed is:

1. An access control barring method, applied to a base station, the method comprising:
    configuring for a user equipment (UE) a dedicated signaling for indicating whether to restart a designated timer, in which the designated timer is a timer started by the UE for barring access control; and
    sending the dedicated signaling to the UE, so that the UE stops or continues to run the dedicated timer based on the dedicated signaling;
    wherein the designated timer comprises a first timer or a second timer, wherein the first timer is configured to characterize a timer that is started after the UE fails to initiate an access attempt, and the second timer is configured to characterize a timer that is carried in a radio resource control RRC connection reject message received after the UE initiates an RRC connection request.

2. The method of claim 1, wherein the dedicated signaling comprises:
- an RRC connection release message configured for the UE in a connected state;
- an RRC connection reconfiguration message configured for the UE in a connected state;
- an RRC connection release message configured for the UE in an inactive state;
- an RRC connection reject message configured for the UE in an inactive state;
- an RRC connection establishment message configured for the UE in an inactive state; or
- an RRC connection recovery message configured for the UE in an inactive state.

3. The method of claim 1, wherein configuring, for the UE, the dedicated signaling for indicating whether to restart the designated timer comprises:
- generating first information for indicating to restart the designated timer;
- adding, in response to determining to indicate to restart the designed timer, the first information to the dedicated signaling; and
- not adding, in response to determining to indicate not to restart the designed timer, the first information to the dedicated signaling.

4. The method of claim 1, wherein configuring, for the UE, the dedicated signaling for indicating whether to restart the designated timer comprises:
- generating, in response to determining to indicate to restart the designed timer, second information for indicating to restart the designated timer, and adding the second information to the dedicated signaling; and
- generating, in response to determining to indicate not to restart the designed timer, third information for indicating not to restart the designated timer, and adding the third information to the dedicated signaling.

5. The method of claim 1, wherein configuring, for the UE, the dedicated signaling for indicating whether to restart the designated timer comprises:
- receiving a handover request sent by a source base station, in which the handover request comprises reference information for determining whether to restart the designated timer, wherein the base station is a target base station and the dedicated signaling comprises a cell handover command; and
- configuring the cell handover command for indicating whether to restart the designated timer based on the reference information.

6. The method of claim 5, wherein the reference information comprises a duration of a timer configured for the UE by the source base station for barring the access control.

7. The method of claim 1, wherein configuring, for the UE, the dedicated signaling for indicating whether to restart the designated timer comprises:
- configuring, for the UE, an intra-cell handover command for indicating whether to restart the designated timer during an intra-cell handover, wherein the dedicated signaling comprises the intra-cell handover command.

8. An access control barring method, applied to a user equipment (UE), the method comprising:
- starting a designated timer for barring access control;
- receiving, from a base station, a dedicated signaling for indicating whether to restart the designated timer when the designated timer does not reach a designated stop time; and
- stopping or continuing to run the designated timer based on the dedicated signaling;

wherein the designated timer comprises a first timer or a second timer, wherein the first timer is configured to characterize a timer that is started after the UE fails to initiate an access attempt, and the second timer is configured to characterize a timer that is carried in a radio resource control RRC connection reject message received after the UE initiates an RRC connection request.

9. The method of claim 8, wherein the dedicated signaling comprises:
- an RRC connection release message configured for the UE in a connected state;
- an RRC connection reconfiguration message configured for the UE in a connected state;
- an RRC connection release message configured for the UE in an inactive state;
- an RRC connection reject message configured for the UE in an inactive state;
- an RRC connection establishment message configured for the UE in an inactive state; or
- an RRC connection recovery message configured for the UE in an inactive state.

10. The method of claim 8, wherein stopping or continuing to run the designated timer based on the dedicated signaling comprises:
- stopping, in case that first information for indicating to restart the designated timer is included in the dedicated signaling, the designated timer based on the first information; and
- continuing, in case that the first information is not included in the dedicated signaling, to run the designated timer.

11. The method of claim 8, wherein stopping or continuing to run the designated timer based on the dedicated signaling comprises:
- stopping, in case that second information for indicating to restart the designated timer is included in the dedicated signaling, the designated timer based on the second information; and
- continuing, in case that third information for indicating not to restart the designated timer is included in the dedicated signaling, to run the designated timer based on the third information.

12. The method of claim 8, wherein stopping the designated timer based on the dedicated signaling comprises:
- stopping, in case that a cell handover command indicates to restart the designated timer, the designated timer based on the cell handover command, wherein the base station is a target base station, and the dedicated signaling comprises the cell handover command; and
- continuing, in case that the cell handover command indicates not to restart the designated timer, to run the designated timer based on the cell handover command.

13. The method of claim 8, wherein stopping the designated timer based on the dedicated signaling comprises:
- stopping, in case that an intra-cell handover command indicates to restart the designated timer, the designated timer based on the intra-cell handover command, wherein the dedicated signaling comprises the intra-cell handover command; and
- continuing, in case that the intra-cell handover command indicates not to restart the designated timer, to run the designated timer based on the intra-cell handover command.

14. A non-transitory computer-readable storage medium storing a plurality of programs for execution by a computing device having one or more processors, wherein the plurality of programs, when executed by the one or more processors, cause the computing device perform the access control barring method of claim 1.

15. A non-transitory computer-readable storage medium storing a plurality of programs for execution by a computing device having one or more processors, wherein the plurality of programs, when executed by the one or more processors, cause the computing device to perform the access control barring method of claim 8.

16. A base station, comprising:
one or more processors; and
a non-transitory computer-readable storage medium for storing instructions executable by the one or more processors;
wherein the one or more processors are configured to perform the method of claim 1.

17. A device, comprising:
one or more processors; and
a non-transitory computer-readable storage medium for storing instructions executable by the one or more processors;
wherein the one or more processors are configured to:
start a designated timer for barring access control;
receive, from a base station, a dedicated signaling for indicating whether to restart the designated timer when the designated timer does not reach a designated stop time; and
stop or continue to run the designated timer based on the dedicated signaling;
wherein the designated timer comprises a first timer or a second timer, wherein the first timer is configured to characterize a timer that is started after the UE fails to initiate an access attempt, and the second timer is configured to characterize a timer that is carried in a radio resource control RRC connection reject message received after the UE initiates an RRC connection request.

18. The method of claim 5, wherein the reference information comprises a duration of a timer configured for the UE by the source base station for barring a load of the source base station.

* * * * *